(12) United States Patent
Blanchard et al.

(10) Patent No.: US 10,935,642 B2
(45) Date of Patent: *Mar. 2, 2021

(54) DETECTION COUNTER MEASURE METHOD AND APPARATUS

(71) Applicant: BAE SYSTEMS PLC, London (GB)

(72) Inventors: Paul Michael Blanchard, South Gloucestershire (GB); Nicholas Giacomo Robert Colosimo, Preston (GB)

(73) Assignee: BAE Systems plc, London (GB)

( * ) Notice: Subject to any disclaimer, the term of this patent is extended or adjusted under 35 U.S.C. 154(b) by 380 days.

This patent is subject to a terminal disclaimer.

(21) Appl. No.: 15/564,065

(22) PCT Filed: Apr. 7, 2016

(86) PCT No.: PCT/GB2016/050984
§ 371 (c)(1),
(2) Date: Oct. 3, 2017

(87) PCT Pub. No.: WO2016/162684
PCT Pub. Date: Oct. 13, 2016

(65) Prior Publication Data
US 2018/0095169 A1  Apr. 5, 2018

(30) Foreign Application Priority Data

Apr. 10, 2015 (GB) ........................ 1506199
Aug. 4, 2015 (EP) ................... 15275181.4

(51) Int. Cl.
*G01S 7/495* (2006.01)
*F41H 3/00* (2006.01)
(Continued)

(52) U.S. Cl.
CPC ............... *G01S 7/495* (2013.01); *F41H 3/00* (2013.01); *G01S 7/4808* (2013.01); *G01S 17/02* (2013.01)

(58) Field of Classification Search
CPC .................................. G01S 7/495; F41H 3/00
See application file for complete search history.

(56) References Cited

U.S. PATENT DOCUMENTS 4,686,605 A  8/1987 Eastlund
4,999,637 A  3/1991 Bass
(Continued)

FOREIGN PATENT DOCUMENTS

DE    10245682 A1   4/2004
WO    9428361 A1   12/1994
(Continued)

OTHER PUBLICATIONS

International Preliminary Report on Patentability of Internatinal Application No. PCTGB2016050948, dated Oct. 10, 2017, 8 pages.
(Continued)

*Primary Examiner* — Marcus E Windrich
(74) *Attorney, Agent, or Firm* — Maine Cernota & Rardin

(57) ABSTRACT

A counter measure apparatus and method for modifying a path of an electromagnetic detector signal (204) so as to prevent incidence thereof on a platform (200), the apparatus comprising an electromagnetic radiation source, communicably coupled to a control system. The control system is configured to create an atmospheric element (202) operative to simulate a physical electromagnetic radiation path modifying device within an atmospheric volume located in said electromagnetic detector signal path (204) by causing electromagnetic radiation from the source to be applied to a selected plurality of three-dimensional portions of said atmospheric volume so as to heat and/or ionise the air within
(Continued)

said portions, wherein said selected portions are spatially located together in a substantially unbroken, three-dimensional configuration.

15 Claims, 9 Drawing Sheets

(51) Int. Cl.
  *G01S 7/48* (2006.01)
  *G01S 17/02* (2020.01)

(56) References Cited

U.S. PATENT DOCUMENTS

| | | | |
|---|---|---|---|
| 5,041,834 A | 8/1991 | Koert | |
| 5,269,288 A | 12/1993 | Stirbl et al. | |
| 5,400,688 A | 3/1995 | Eninger | |
| 5,415,156 A | 5/1995 | Stirbl et al. | |
| 5,593,549 A | 1/1997 | Stirbl et al. | |
| 5,684,621 A | 11/1997 | Downing | |
| 6,111,237 A | 8/2000 | Paustian | |
| 6,377,436 B1 | 4/2002 | Margolin | |
| 7,255,062 B1 * | 8/2007 | Higman | H05H 1/46 118/723 AN |
| 8,981,261 B1 * | 3/2015 | Tillotson | F41H 13/0093 219/383 |
| 9,305,378 B1 | 4/2016 | Holmes | |
| 2003/0160724 A1 * | 8/2003 | Alexeff | H01Q 1/26 343/701 |
| 2004/0135744 A1 | 7/2004 | Bimber | |
| 2007/0114322 A1 | 5/2007 | Smereczniak | |
| 2007/0180983 A1 | 8/2007 | Farinella | |
| 2009/0009862 A1 | 1/2009 | Hong | |
| 2009/0084252 A1 * | 4/2009 | Marquis | H04K 3/825 89/1.11 |
| 2009/0171477 A1 | 7/2009 | Nayfeh et al. | |
| 2010/0258708 A1 | 10/2010 | Meyers et al. | |
| 2010/0319526 A1 * | 12/2010 | Imholt | F41H 5/007 89/36.08 |
| 2011/0001429 A1 | 1/2011 | Davis | |
| 2011/0121158 A1 | 5/2011 | Corke et al. | |
| 2013/0057151 A1 | 3/2013 | Curry | |
| 2013/0099096 A1 | 4/2013 | Hutchin | |
| 2014/0125964 A1 | 5/2014 | Jonas | |
| 2014/0176954 A1 | 6/2014 | Scott | |
| 2014/0224776 A1 | 8/2014 | Elhadj | |
| 2014/0327747 A1 | 11/2014 | Kong | |
| 2016/0097616 A1 | 4/2016 | Weigold | |
| 2014/7011854 | 4/2017 | Kuri | |
| 2017/0127507 A1 | 5/2017 | Hunt | |
| 2017/0212602 A1 | 7/2017 | Hsu | |
| 2018/0084244 A1 | 3/2018 | Colosimo | |
| 2018/0088436 A1 | 3/2018 | Colosimo | |
| 2018/0095169 A1 | 4/2018 | Blanchard | |
| 2018/0128908 A1 | 5/2018 | Blanchard | |
| 2018/0143303 A1 | 5/2018 | Colosimo | |

FOREIGN PATENT DOCUMENTS

| | | |
|---|---|---|
| WO | 2002056111 A1 | 7/2002 |
| WO | 2011057342 A1 | 5/2011 |
| WO | 2011063407 A2 | 5/2011 |
| WO | 2013039465 A1 | 3/2013 |

OTHER PUBLICATIONS

International Search Report and Written Opinion of International Application No. PCT/GB2016/050948, dated Jun. 2, 2016, 12 pages.
European Search Report of European Application No. EP15275113, dated Sep. 18, 2015, 6 pages.
Great Britain Search Report of Great Britain Application No. GB1506079.1, dated Oct. 5, 2015, 3 pages.
"Atmospheric lensing. A Weapon of Selective Destruction" by Steven J. Smith, Nov. 29, 2010. https://web.archive.org/web/20101129164210/http://whale.to/b/atmospheric_lensing.html, accessed on Mar. 10, 2015.
"Can we use atmospheric lenses as telescopes?" online discussion, last comment Oct. 30, 2014, http://www.thenakedscientists.com/forum/index.php?topic=52568.0, accessed on Mar. 10, 2015.
International Search Report and Written Opinion of International Application No. PCT/GB2016/050967, dated Jun. 1, 2016, 13 pages.
Brian W. Neiswander et al: "Plasma Lens for Optical Path Difference Control", AIAA Journal, vol. 50, No. 1, Jan. 1, 2012, pp. 123-130, XP055212822.
Bejot P et al: "32TW atmospheric white-light laser", Applied Physics Letters, American Institute of Physics, vol. 90, No. 15, Apr. 10, 2007, pp. 151106-151106.
Great Britain Search Report of Great Britain Application No. GB1506081.7, dated Oct. 8, 2015, 3 pages.
European Search Report of European Application No. EP15275114, dated Sep. 17, 2015, 8 pages.
International Search Report and Written Opinion of International Application No. PCT/GB2016/050984, dated Jun. 8, 2016, 15 pages.
Anonymous: "Plasma stealth—Wikipedia, the free encyclopedia", Mar. 21, 2015, XP055245259, Retrieved from the internet: https://en.wikipedia.org/wiki/Plasma_stealth.
Bhaskar Chaudhury et al: "Stidy and Optimization of Plasma-Based Radar Cross Section Reduction Using Three-Dimensional Computations", IEEE Transactions on Plasma Science, IEEE Service Center, Piscataway, NJ, US, vol. 37, No. 11, Nov. 1, 2009, pp. 2116-2127.
Great Britain Search Report of Great Britain Application No. GB1506199.7, dated Sep. 30, 2015, 4 pages.
European Search Report of European Application No. EP15275181, dated Jan. 28, 2016, 10 pages.
International Search Report and Written Opinion of International Application No. PCT/GB2016/050980, dated Jun. 10, 2016, 15 pages.
Anonymous: "Deflector Shield—Wookieepedia—Wikia", 1999, XP055244465, Retrieved from the internet: URL:http://starwars.wikia.com/wiki/Deflector_shield/Legends.
Great Britain Search Report of Great Britain Application No. GB1506200.3, dated Sep. 30, 2015, 5 pages.
European Search Report of European Application No. EP15275183, dated Jan. 26, 2016, 10 pages.
International Search Report and Written Opinion of International Application No. PCT/GB2016/050873, dated May 31, 2016, 13 pages.
Baris I. Erkmen: "Computational ghost imaging for remote sensing", Hournal of the Optical Society of America A, vol. 29, No. 5, May 1, 2012, pp. 782-6600, XP055219044.
Baoqing Sun et al: "Normalized ghost imaging", Optics Express, vol. 20, No. 15, Jul. 16, 2012, p. 16892, XP055219055.
Great Britain Search Report of Great Britain Application No. GB1506089, dated Sep. 3, 2015, 3 pages.
European Search Report of European Application No. EP15275119, dated Oct. 12, 2015, 7 pages.
International Preliminary Report on Patentability of International Application No. PCTGB20160509673, dated Oct. 19, 2017, 8 pages.
European Search Report of European Application No. EP15275116.0, dated Sep. 17, 2015, 7 pages.
Great Britain Search Report of Great Britain Application No. GB1506085.8, dated Oct. 21, 2015, 3 pages.
PCT Search Report for PCT Application No. PCT/GB2016/051003, dated May 24, 2016, 13 pages.
Berreman, D.W., "A Lens or Light Guide Using Convectively Distorted Thermal Gradients in Gases", Bell System Technical Journal, vol. 43, issue 4, pp. 1469-1475, Jul. 1964.
International Preliminary Report on Patentability of International Application No. PCTGB2016050873, dated Oct. 19, 2017, 8 pages.
International Preliminary Report on Patentability of International Application No. PCTGB2016050980, dated Oct. 19, 2017, 6 pages.

(56) References Cited

OTHER PUBLICATIONS

International Preliminary Report on Patentability of International Application No. PCTGB2016051003, dated Oct. 19, 2017, 9 pages.

* cited by examiner

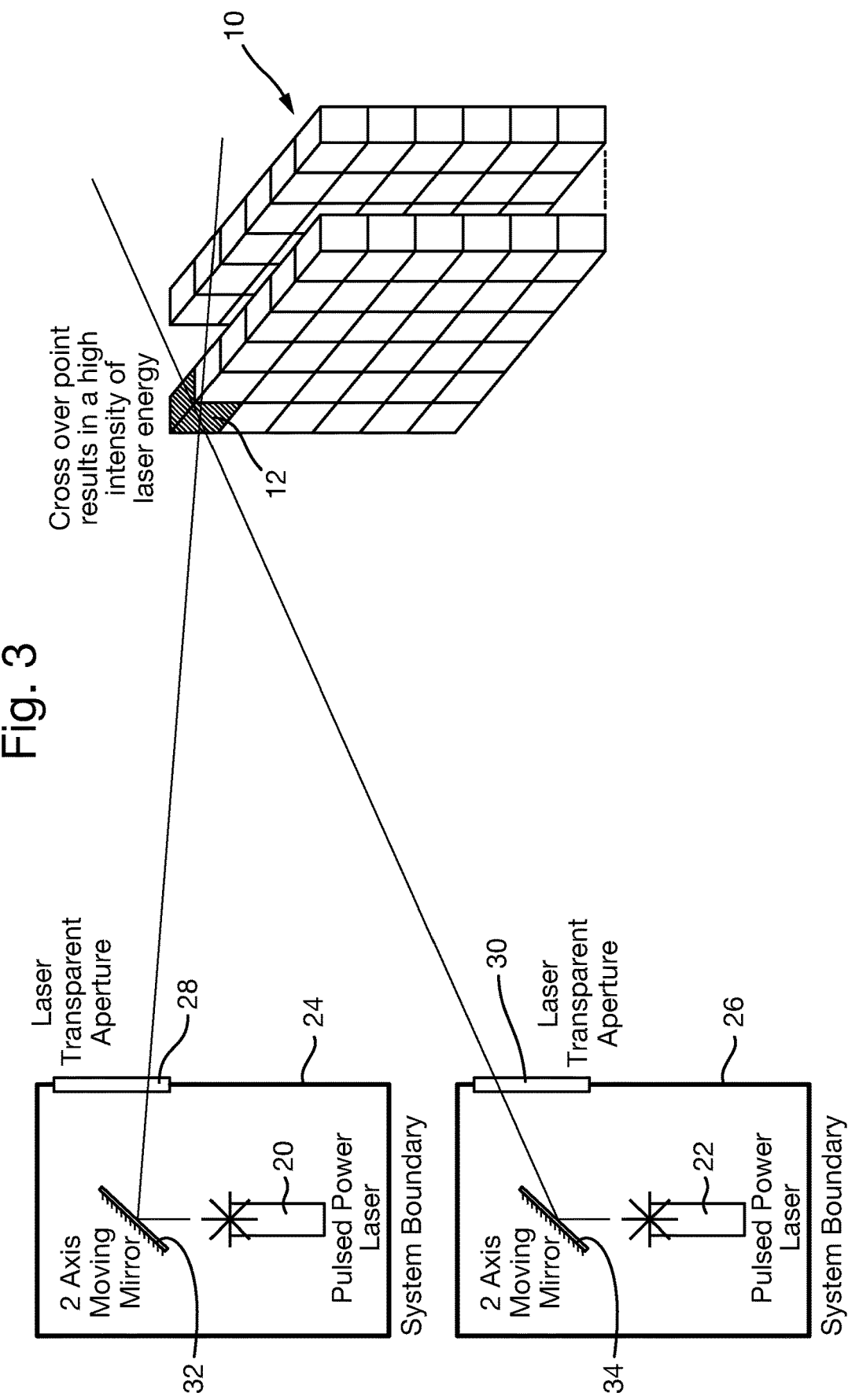

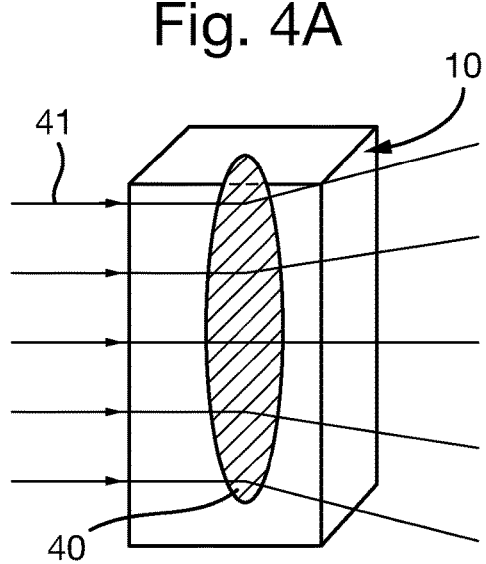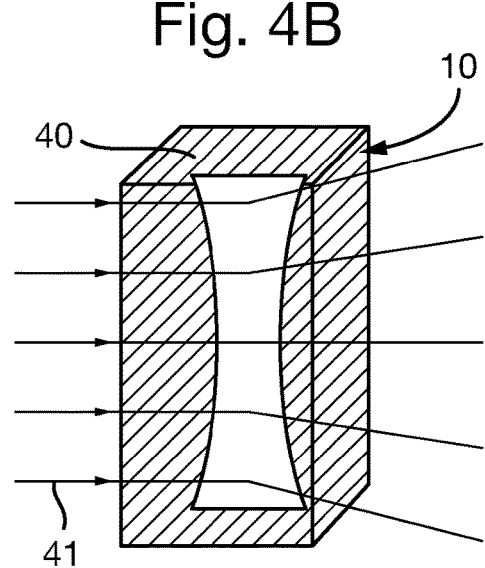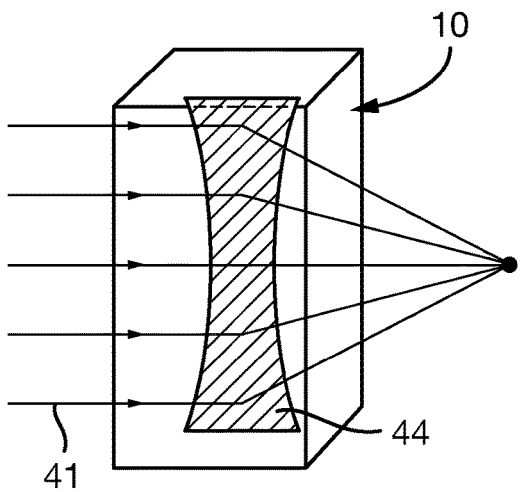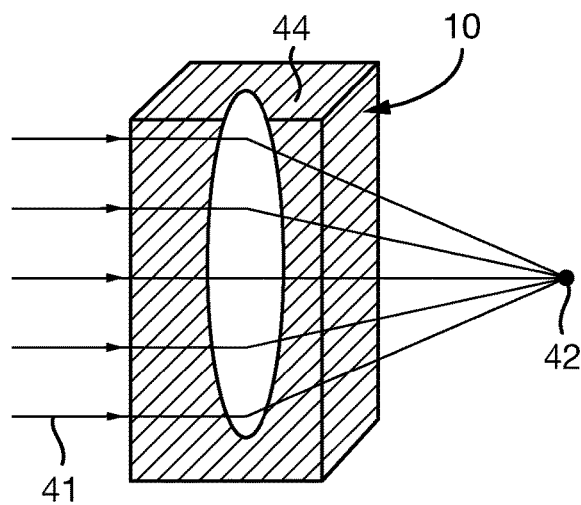

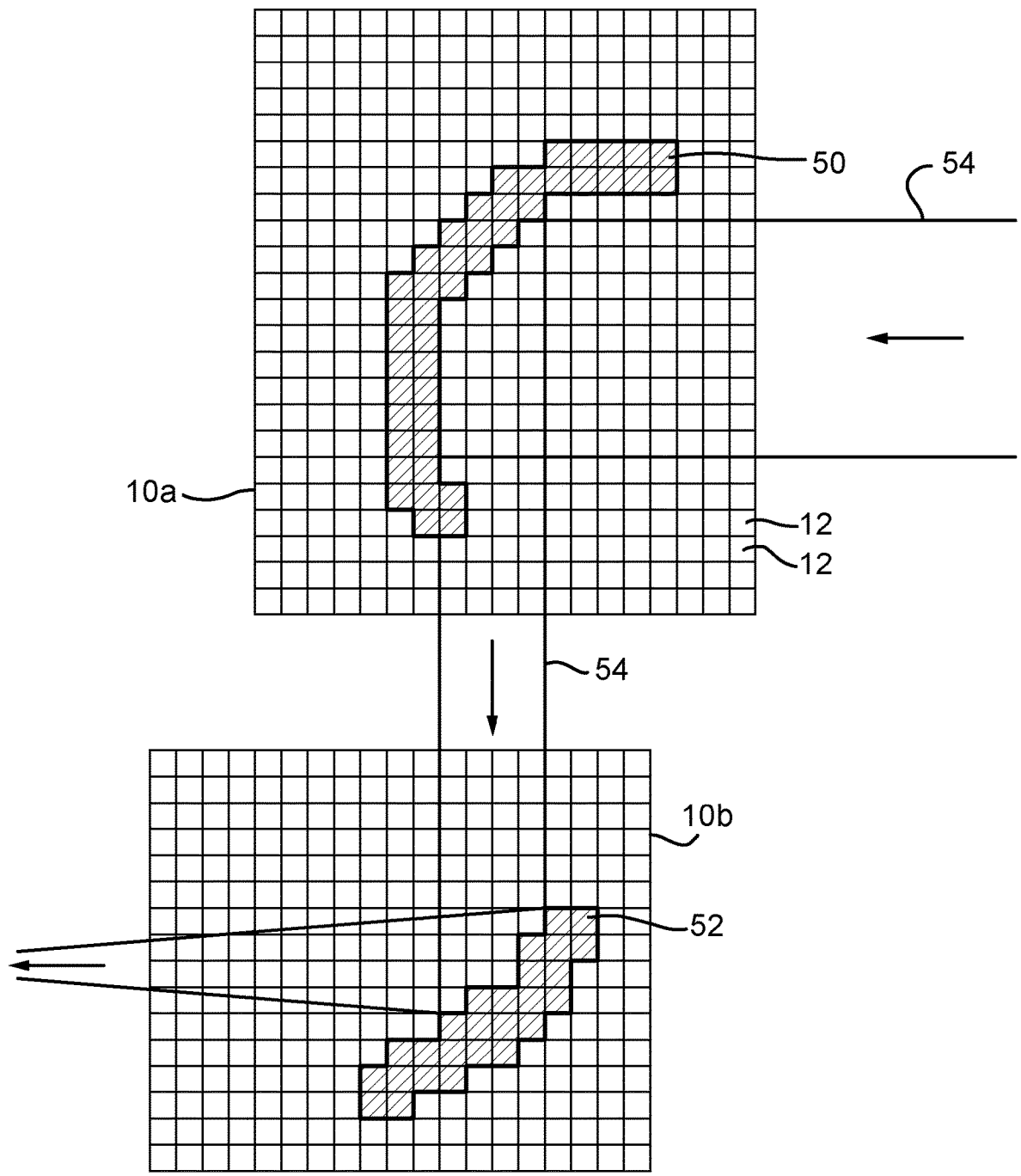

DETECTION COUNTER MEASURE METHOD AND APPARATUS

RELATED APPLICATIONS

This application is a national phase application filed under 35 USC § 371 of PCT Application No. PCT/GB2016/050984 with an International filing date of Apr. 7, 2016 which claims priority of GB Patent Application 1506199.7 filed Apr. 10, 2015 and EP Patent Application 15275181.4 filed Aug. 4, 2015. Each of these applications is herein incorporated by reference in its entirety for all purposes.

This invention relates generally to a detection counter measure method and apparatus and, more particularly but not necessarily exclusively, to a method and apparatus for protecting a target, such as an aircraft, from detection by radar or other detection systems.

Stealth technology covers a range of techniques used with, for example, aerial vehicles to make them less visible (ideally invisible) to radar, infrared and other detection methods, and in the case of radar stealth, the objective is to reduce the amount of signal returned (reflected) from an aircraft to an adversary's radar system, where their transmitter and receiver may be substantially co-located. This is achieved reflecting (in a 'safe'/non threat direction) or absorbing (hence preventing reflection) the adversary's radar emissions.

Stealth technology can take the form of an attachable underwing pod or could be embedded in the airframe. Some techniques comprise the use of special reflective or absorptive materials. However, such techniques result in an altered aircraft shape and/or configuration, which may have an adverse effect on aerodynamic performance, and the additional weight overhead necessitated by such techniques, particularly in the case of the use of special materials, is clearly undesirable in aerial applications. Furthermore, counter-stealth technologies are being deployed, wherein the radar transmitter and receiver are not co-located such that the range of angles over which it is 'safe' to deflect electromagnetic energy diminishes significantly. Such non co-located radar systems are known as bi-static or multi-static systems. Another counter-stealth method comprises the detection of a 'drop' in attenuation in an electromagnetic environment, caused, for example, by a stealth aircraft absorbing the energy emitted by an adversary's radar system. In other words, the 'hole' in the returned energy can be tracked to identify the presence of an aircraft.

An electronic countermeasure (ECM) device is an electrical or electronic device, generally designed to trick or deceive radar, sonar or other detection systems. Known ECM systems comprise one or more electronically scanned jamming pods, mounted on a target aircraft (i.e. the aircraft required to be protected) or on an aircraft located in the vicinity thereof and configured to jam detection signals. However, once again, the additional size, weight and power overhead necessitated by such systems is disadvantageous and may, in some cases, be prohibitive.

It would be desirable to provide a counter measure method and apparatus for protecting a target from detection by radar or other detection systems that use electromagnetic radiation detection signals, which ameliorates at least some of the issues identified above.

Thus, in accordance with an aspect of the present invention, there is provided a counter measure apparatus for modifying a path of an electromagnetic detector signal so as to prevent incidence thereof on a platform, the apparatus comprising an electromagnetic radiation source, communicably coupled to a control system, said control system being configured to create an atmospheric element operative to modify the electromagnetic detector signal within an atmospheric volume located in said electromagnetic detector signal radiation path by causing electromagnetic radiation from said source to be applied to a selected plurality of three-dimensional portions of said atmospheric volume so as to heat and/or ionise the air within said portions so as to generate the atmospheric element, wherein said selected portions are spatially located together in a substantially unbroken, three-dimensional configuration.

The control system may comprise a detection module for detecting an electromagnetic detector signal and to generate data representative of its propagation angle relative to said platform, and said control system may be configured to define the location and/or size and/or orientation of said atmospheric volume within said electromagnetic detector signal path, based on said data generated by said detection module. The control system may further comprise a tracking module for tracking said electromagnetic detector signal relative to said platform and generating tracking data, and said control system may be configured to alter the location and/or size and/or orientation of said atmospheric volume based on said tracking signals so as to maintain said atmospheric element within said electromagnetic detector signal path.

The electromagnetic radiation source may include a beam steering mechanism for selectively steering a beam of electromagnetic radiation output therefrom, said control system optionally being communicably coupled to said beam steering mechanism and configured to generate signals for steering said beam of electromagnetic radiation relative to said atmospheric volume so as to sequentially apply electromagnetic radiation from said source to said selected portions.

The apparatus may comprise a beam splitting module for splitting a beam output from said electromagnetic radiation source into a plurality of paths corresponding to relative locations of selected portions.

In an exemplary embodiment of the invention, the control system may comprise a database on which is stored data representative of a three-dimensional matrix configuration of individual three-dimensional elements corresponding to an atmospheric element to be generated for modifying the electromagnetic detector signal radiation, and, may also comprise a processor for mapping said stored three-dimensional matrix configuration of elements to respective selected portions of said atmospheric volume, the processor being configured to generate actuation signals configured to cause said electromagnetic radiation source to apply electromagnetic radiation to said selected plurality of portions of said atmospheric volume, corresponding to said stored three-dimensional matrix configuration of elements, so as to heat and/or ionise the air therein and thereby generate the atmospheric element in the atmospheric volume.

The apparatus may further comprise an atmospheric element monitoring module for monitoring atmospheric conditions, generating data representative thereof, and transmitting said data to said processor, said processor being configured to generate adjusted actuation signals configured to adjust at least one characteristic of said electromagnetic radiation so as to compensate for atmospheric distortion.

In an exemplary embodiment of the invention, the apparatus may further comprise a quality monitoring module for monitoring the performance of the atmospheric element against a predefined set of desired criteria, and generating signals to dynamically adjust beam steering and/or power of said electromagnetic radiation source so as to reduce or eliminate deviation of the properties and characteristics of the atmospheric element from that which is defined by the predefined criteria.

In some cases, a platform may enter a potentially hostile environment with one or more atmospheric electromagnetic radiation path modifying elements already created and located around the platform, based on some a priori knowledge of the direction from which adversary detector signals may originate. However, some exemplary embodiments of the present invention include a detection module for detecting an incoming electromagnetic detector signal and causing such an atmospheric element to be created at location and orientation relative to the platform, and in the path of the incoming electromagnetic detector signal, to modify the path of the detector signal and direct it along a desired, modified path. In either case, the tracking module may track the path of said electromagnetic detector signal and generate a tracking signal for use by said control system to adjust the location of said atmospheric volume so as to maintain said atmospheric element within said path of said electromagnetic detector signal.

In apparatus according to an exemplary embodiment, the selected portions may be spatially located together in a substantially unbroken three-dimensional configuration corresponding to device generated atmospheric element.

The selected portions may be configured such that non-selected portions are in a configuration corresponding to a three-dimensional shape of a generated atmospheric element.

The control system may be configured to cause electromagnetic radiation from said source to be applied to a selected plurality of three-dimensional portions of said atmospheric volume so as to heat and/or ionise the air therein and thus change the refractive index thereof.

The atmospheric element may be operative to generate a radiation diverging device and said selected portions are spatially located together in a convex lens configuration. Alternatively, the selected portions may be spatially located together such that the non-selected portions are in a concave lens configuration.

The atmospheric element may be operative to generate a diffractive device and said selected portions define a plurality of three-dimensional shapes, each spatially separated from each other within said atmospheric volume. In this case, the three-dimensional shapes, spatially separated, may define a plurality of concentric transmissive and adjacent substantially opaque regions in the form of a zone plate.

The atmospheric element may be operative to generate a reflective device and the control system is configured to cause electromagnetic radiation from said source to be applied to a selected plurality of three-dimensional portions of said atmospheric volume so as to heat and/or ionise the air therein.

The electromagnetic radiation source may comprise one or more lasers.

In accordance with another aspect of the invention, there is provided a counter-measure method for modifying a path of an electromagnetic detector signal so as to prevent incidence thereof on a platform, the method comprising providing an electromagnetic radiation source and a control system communicably coupled thereto, the method further comprising dividing an atmospheric volume into a matrix of three dimensional portions, configuring said control system to generate an atmospheric element operative to modify the electromagnetic detector signal within an atmospheric volume located in said electromagnetic detector signal path by causing electromagnetic radiation from said source to be applied to a selected plurality of three-dimensional portions of said atmospheric volume so as to heat and/or ionise the air within said portions, wherein said selected portions are spatially located together in a substantially unbroken, three-dimensional configuration to generate said atmospheric element.

The atmospheric volume may be divided into an array of three-dimensional portions, and the method may comprise the step of applying electromagnetic radiation to said selected portions within said array.

Aspects of the present invention extend to a control system for apparatus as described above, configured to be communicably coupled to an electromagnetic radiation source, said control system being configured to generate an atmospheric element operative to modify the radiation path of the electromagnetic detector signal within an atmospheric volume located in said electromagnetic detector signal path by causing electromagnetic radiation from said source to be applied to a selected plurality of three-dimensional portions of said atmospheric volume so as to heat and/or ionise the air within said portions, wherein said selected portions are spatially located together in a substantially unbroken, three-dimensional configuration to generate said atmospheric element.

These and other aspects of the present invention will be apparent from the following specific description in which embodiments of the present invention are described, by way of examples only, and with reference to the accompanying drawings, in which:

FIG. 3 is a schematic diagram illustrating an alternative manner in which laser power may be applied to selected cells within a matrix in accordance with the principles employed in another exemplary embodiment of the present invention;

FIG. 4A is a schematic diagram illustrating an atmospheric diverging lens created in accordance with the principles employed in an exemplary embodiment of the present invention;

FIG. 4B is a schematic diagram illustrating an alternative atmospheric diverging lens created in accordance with the principles employed in an exemplary embodiment of the present invention;

FIG. 5A is a schematic diagram illustrating an atmospheric converging lens created in accordance with the principles employed in an exemplary embodiment of the present invention;

FIG. 5B is a schematic diagram illustrating an alternative atmospheric converging lens created in accordance with the principles employed in an exemplary embodiment of the present invention;

FIG. 7A is a schematic side view of the focussing arrangement of FIG. 7;

Thus, aspects of the present invention operate on the principle of using one or more laser devices to selectively alter the refractive index and/or cause ionisation of portions of a three dimensional region of the atmosphere remote from the laser device(s) so as to create or simulate an electromagnetic radiation path modifying component of a desired size and having selected electromagnetic radiation path modifying properties.

Figure 1:
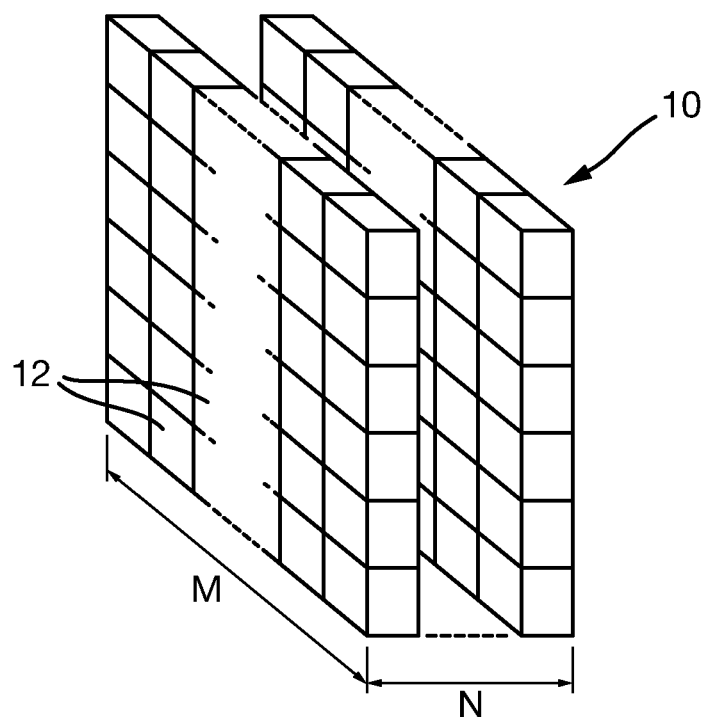
FIG. 1 is a schematic diagram illustrating the concept of an M by N cell matrix for the purposes of defining an atmospheric volume within which an atmospheric EM radiation path modifying component may be created in accordance with the principles employed in an exemplary embodiment of the present invention.

In general, and referring to FIG. 1 of the drawings, the volume of the atmosphere in which an EM radiation path modifying component is required to be created can be considered as a cell matrix 10 comprised of M rows and N columns or layers of 'cells' 12, wherein a cell is simply a predefined three-dimensional portion of the matrix. In the example shown, each cell is identical in size and shape, but this is not essential, and the present invention is not necessarily intended to be limited in this regard. It will also be appreciated that the number of cells in the vertical dimension of the cell matrix may vary. Thus, the cell matrix may be of any desired size, shape and number of cells.

Within the matrix 10, the three dimensional structure of an EM radiation path modifying device can be defined in terms of a number of cells 12 in a desired configuration, and it is these cells that will then be targeted by the laser source in order to effect the desired change in their respective properties (either by ionisation or heating to cause a change in refractive index).

It is known that an increase in temperature of a volume of air causes a corresponding decrease in density of that volume of air. As a result, the refractive index of warm air is lower than that of cooler (and therefore denser) air. Thus, some aspects of the present invention operate on the principle that by providing a volume of air that is warmer than the air around it, that volume of air can cause refraction of a beam of electromagnetic radiation as it passes through, in a manner similar to a convergent or divergent lens.

It is also known that if an electric field of a sufficiently high power is applied to a volume of air, the air may be ionised. Ionised air has reflective properties over a range of electromagnetic radiation wavelengths, such properties being a function of density and the type of ionisation created. Thus, some aspects of the present invention operate on the principle that by ionising a volume of air can cause it to reflect a beam of electromagnetic radiation as it hits that volume, in a manner similar to a mirror or similarly reflective device. A mixture of the two principles can be used to create a diffractive element, as will be described in more detail later.

Thus, referring back to FIG. 1 of the drawings, it will be appreciated that by selectively heating or ionising cells 12 within the matrix 10 a three dimensional atmospheric EM radiation path modifying component can be created using a high power electromagnetic radiation source. This may be achieved in a number of different ways. For example, a pulsed power laser (PPL) may be employed, and the 'Kerr' effect exploited therewith in order to attain self focussing of the laser beam at a required point (i.e. within the selected cell). Alternatively, a combination (i.e. crossing over) of two continuous wave (CW) laser beams at a required point may be used to achieve the desired effect. In any event, the laser system(s) is/are configured to selectively heat or ionise the atmosphere, thus changing its refractive index and electromagnetic properties such that electromagnetic energy passing through the heated cells is refracted and/or electromagnetic energy hitting the ionised cells is reflected.

Figure 2:
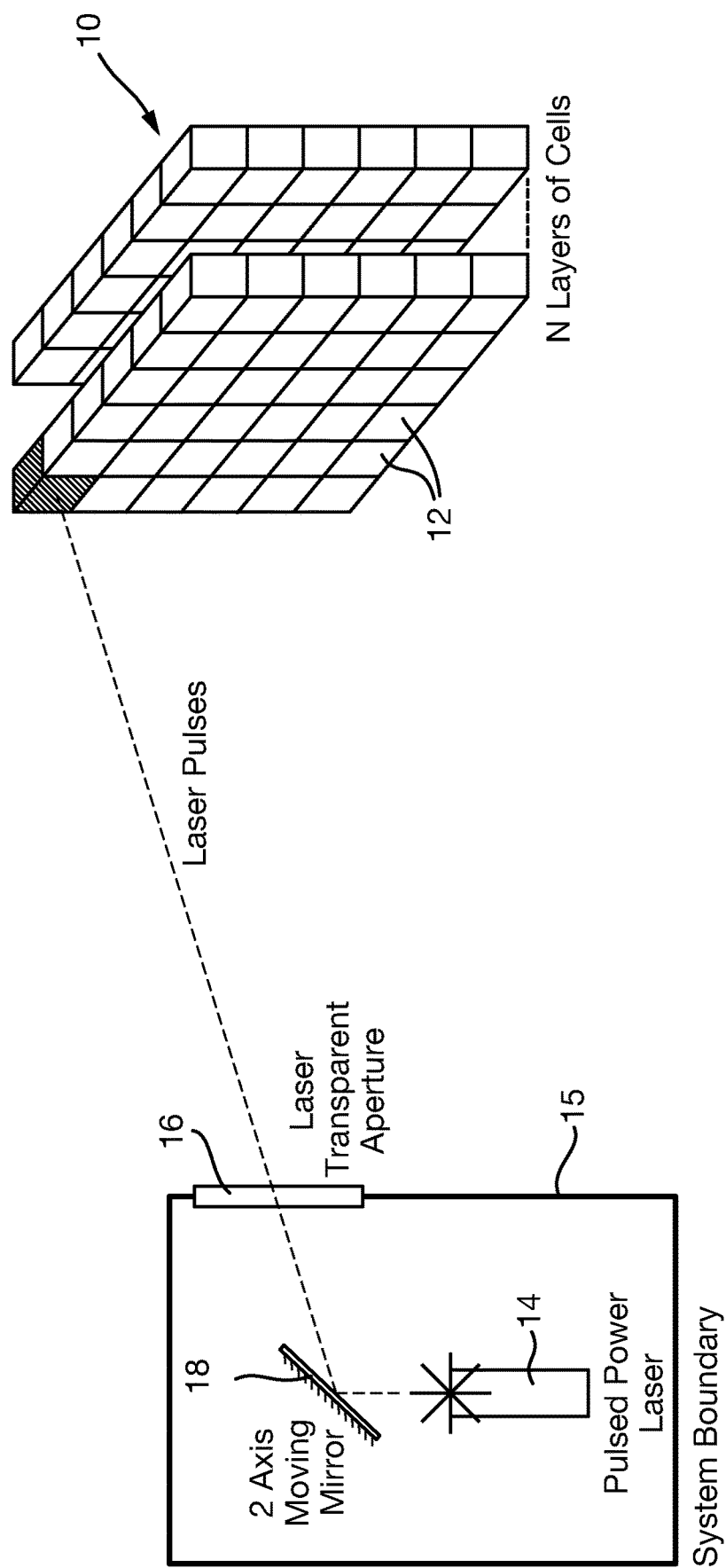
FIG. 2 is a schematic diagram illustrating the manner in which laser power may be applied to selected cells within a matrix in accordance with the principles employed in a first exemplary embodiment of the present invention.

Thus, referring to FIG. 2 of the drawings, apparatus according to one exemplary embodiment of the present invention comprises at least one laser source 14 mounted in an enclosure 15. In the example shown, the laser source 14 is a pulsed power laser source configured to emit high power laser pulses toward the cell matrix 10 via a laser transparent aperture 16. An optically reflective device, i.e. mirror, 18 is mounted on a dual-axis actuator (not shown) in the main laser output path, the actuator being communicably coupled with a control system that is configured to cause the actuator (and, therefore, the mirror 18) to move thereby to selectively direct the laser output through the aperture 16 toward selected cells 12 of the matrix 10. The control system may, for example, be configured to cause the laser output to be scanned across the cell matrix providing a pulse (or more than one pulse) to each selected cell, either via a raster pattern or a pattern optimised to suit the type of atmospheric component required to be created and its operational requirements.

As mentioned briefly above, the laser pulse is self-focussing by means of the 'Kerr' effect, thereby enabling it to deliver enough concentrated power to heat or ionise the cell at which it is directed. The Kerr effect is a change in the refractive index of a material in response to an applied electric field. In the case of a laser pulse of sufficiently high power, its electric field is sufficiently high to change the refractive index of the air. As a result, the cross-sectional area of the pulse (perpendicular to the direction of propagation) can be thought of as shrinking with distance (due to the differences in refractive index), thus bringing the pulse to an intense focus at some point down range of the laser, in this case at the selected cell. This intense focus is of sufficiently high intensity to heat or ionise the cell to change its refractive index and/or other EM radiation path modifying properties. One or more pulses may be provided per cell, dependent upon the desired effect and environmental conditions. It may also be necessary to periodically re-supply laser pulses to all selected cells to maintain the required change in refractive index and/or ionisation for as long as the atmospheric component is required, as once the laser power is removed from a cell, the air therein will very quickly return to its normal (unheated or non-ionised) state.

Referring to FIG. 3 of the drawings, in an alternative exemplary embodiment of the invention, two (or more) CW (continuous wave) laser sources 20, 22 may be provided in respective enclosures 24, 26, each having a laser transparent aperture 28, 30 therein. Once again, each laser system is provided with a mirror 32, 34 mounted on a dual-axis actuator (not shown) communicably coupled to a control system (not shown). Operation of the system is similar, in principle, to that described previously with reference to FIG. 3 of the drawings except, in this case, two (or more) spatially separated CW lasers (which may be mounted on the same platform or across different platforms) are used to selectively heat/ionise the atmosphere in each required cell. This is achieved by ensuring (through pointing) that the laser beams cross over at the same point (in the selected cell 12), thereby ensuring that sufficient power is attained. Such scanning may be performed on the basis of a control system configured to maintain a predetermined spatial separation and orientation between the atmospheric component and the electromagnetic radiation source. However, in an alternative exemplary embodiment, such scanning may be performed using a control system configured to direct the source(s) at specific coordinates corresponding to specific respective locations within the atmosphere. In yet another exemplary embodiment, and either in addition to the above-mentioned arrangements or alternatively, it is envisaged that a beam splitter could be employed to split a laser beam into numerous new paths corresponding to the configuration of a plurality of respective cells to be targeted. Thus, a plurality of such cells could be targeted simultaneously, without the need for scanning a single laser path across the cell matrix.

In the following, a number of exemplary atmospheric electromagnetic radiation path modifying components that can be created according to the principles employed in respective exemplary embodiments of the present invention will now be described. However, it will be appreciated by a person skilled in the art that the principles set forth herein can be applied in numerous different ways in order to create other types and configurations of electromagnetic (EM) radiation path modifying components and the present invention is not necessarily intended to be limited in this regard.

Referring to FIG. 4A of the drawings, in one of its simplest forms, an exemplary embodiment of the present invention may be employed to create an atmospheric diverging lens. The illustrated lens 40 is of a double convex lens configuration and, in the example shown, has been created generally centrally within the cell matrix 10 with its longitudinal axis in line with the generally central vertical axis of the matrix 10. In order to create the lens 40, the cells corresponding to the three-dimensional 'structure' of a double convex lens are heated, for example using one of the methods described above, thereby to reduce the refractive index of those cells relative to the surrounding cells, and cause the rays of an incoming beam 41 of electromagnetic radiation to be refracted as they enter the component 40 and diverge. For the avoidance of doubt, it will be appreciated that the atmospheric component 40 is a three-dimensional area within the cell matrix comprised of a plurality of atmospheric cells, each of which has been heated in order to attain the required refractive index. A control system and any number of lasers may be employed to ensure that the correct amount of laser power is applied to each cell in order to attain the required level of heating, having regard to environmental factors and the refractive index change required to be achieved. When the component is no longer required, the laser power can simply be removed, and the atmospheric cells will quickly return to their normal state. In an alternative exemplary embodiment, a diverging lens may be created in accordance with an exemplary embodiment of the invention, by heating the cells surrounding a three-dimensional configuration of cells in the shape of a double concave lens (similar in form to that of a conventional diverging lens). Thus, the resultant atmospheric element would comprise a concave lens-shaped region of unheated cells surrounded by a body of heated cells, as shown in FIG. 4B (wherein the shaded area 40 denotes the heated cells and the double concave lens region is unheated).

Referring to FIG. 5A of the drawings, an exemplary embodiment of the present invention may be used to create an atmospheric converging lens 44. Thus, in this particular case, the three-dimensional 'structure' represented by the heated cells within the matrix 10 comprises a double concave lens structure, wherein the rays of the incoming beam 41 of electromagnetic radiation are 'bent' or refracted as they enter the atmospheric component 44 and converge to a focal point 42. In an alternative exemplary embodiment, a converging lens may be created by heating the cells surrounding a three-dimensional configuration of cells in the shape of a convex lens (similar in form to that of a conventional converging lens). Thus, the resultant atmospheric element would comprise a convex lens-shaped region of unheated cells surrounded by a body of heated cells, as shown in FIG. 5B of the drawings (wherein the shaded area 44 denotes the heated cells and the double convex lens region is unheated). In yet another exemplary embodiment, the body of heated cells may form an annulus having, for example, a double convex cross-section.

In both cases described above with reference to FIGS. 4A and B and 5A and B of the drawings, the refractive index of the heated cells forming the lens structure is substantially constant, and the differing EM radiation path modifying properties (i.e. converging vs. diverging) are achieved by the geometry of the component. In other words, as with a physical component, it is just the geometry of the three dimensional volume of heated cells (or unheated cells) that defines the function of the resultant lens.

Figure 6:
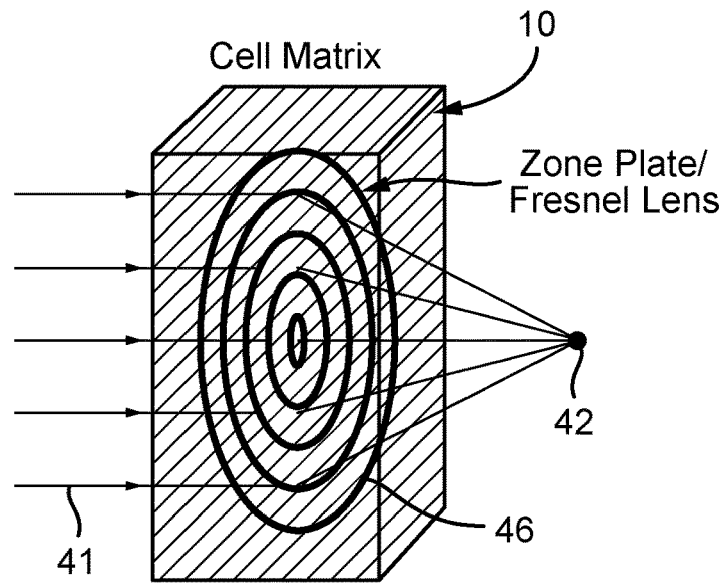
FIG. 6 is a schematic diagram illustrating an atmospheric Fresnel zone plate created in accordance with the principles employed in an exemplary embodiment of the present invention.

Referring now to FIG. 6 of the drawings, in yet another exemplary embodiment of the present invention, diffractive and refractive properties may be combined in order to create more complex atmospheric EM radiation path modifying components. In the illustrated example, a Fresnel zone plate 46 is defined substantially diagonally across the cell matrix 10. The zone plate 46 is formed of concentric rings of heated cells, diametrically separated by unheated cell regions; or it may be formed of concentric rings of ionised (reflective) cells diametrically separated by heated (or unheated) cells (transmissive). The resultant component combines refraction with the diffractive effects from boundaries between regions of significantly different refractive index and/or electromagnetic properties. Thus, it can be seen that more complex EM radiation path modifying components can be created by varying both the geometry and the refractive indices within the atmospheric 'structure'.

Figure 7:
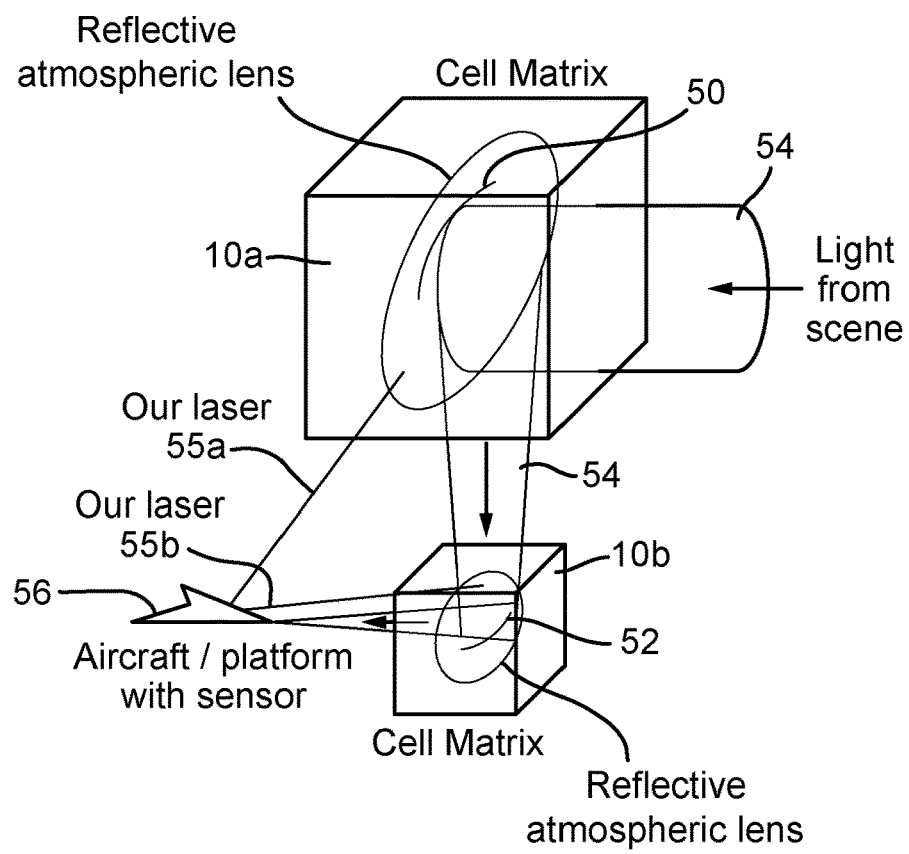
FIG. 7 is a schematic diagram of a focussing arrangement employing atmospheric reflective components created in accordance with the principles employed in an exemplary embodiment of the present invention.

As explained above, it is also possible to simulate reflective components and arrangements in accordance with other exemplary embodiments of the present invention. Thus, referring to FIGS. 7 and 7A of the drawings, a focussing arrangement is illustrated which is comprised of two reflective atmospheric components 50, 52. In this case, two spatially separated cell matrices 10a, 10b are defined, both of which are three-dimensional concave elements (relative to the incoming beam of electromagnetic radiation 54).

The atmospheric reflective components 50, 52 are formed by ionisation of selected cells (in a configuration matching the required 'structure' and orientation of the respective components within the cell matrices 10a,10b). In the example illustrated, the ionisation of the cells for both components may be effected by means of laser sources 55a, 55b mounted in or on the same platform, such as an aircraft 56 or the like. In use, an incoming beam 54 of electromagnetic radiation, such as an adversary detector signal, for example, hits the first reflective component 50 and is reflected and converged toward the second reflective component 52. The beam 54 is then reflected and converged by the second reflective component 52 toward a 'safe' region, for example, or indeed toward another atmospheric electromagnetic radiation path modifying element to further direct a diverted detector signal, back to its original path, as will be illustrated later, or elsewhere.

In the examples illustrated, the cell matrices 10a, 10b are 'upright' and the orientation of the atmospheric elements is achieved by the pattern of the ionised/heated cells. However, it will be appreciated that, in alternative exemplary embodiments of the invention, the cell matrix itself may be oriented to match the required orientation of the atmospheric EM radiation path modifying element and, in this case, the populated cell pattern (relative to the cell matrix) will always be the same for a particular atmospheric element of a specified size. Also, it will be appreciated that a more 'curved' profile of the atmospheric components thus created may be achieved by varying the degree of heating/ionisation in the peripheral populated cells.

Figure 8:
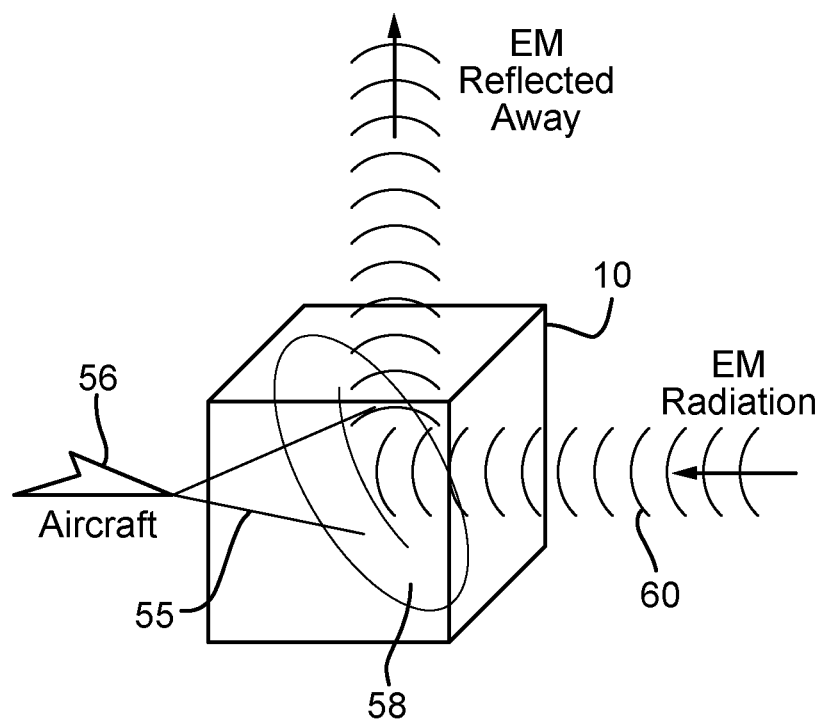
FIG. 8 is a schematic diagram of a diverting arrangement employing an atmospheric reflective component created in accordance with the principles employed in an exemplary embodiment of the present invention.

In yet another exemplary embodiment, and referring to FIG. 8 of the drawings, a diverting arrangement may be dynamically configured by an airborne platform 56 to divert electromagnetic radiation (such as electromagnetic detector signals) therefrom. Thus, in this case, the on-board laser source(s) 55 may be used to ionise selected cells within a defined cell matrix 10 so as to create a three dimensional, reflective area therein which is oriented substantially diagonally across and through the matrix 10 and concave in the direction of the incoming electromagnetic radiation 60. The radiation 60 hits the atmospheric reflective component 58 thus created and is reflected through substantially 90°, away from the platform 56, as illustrated.

Figure 9:
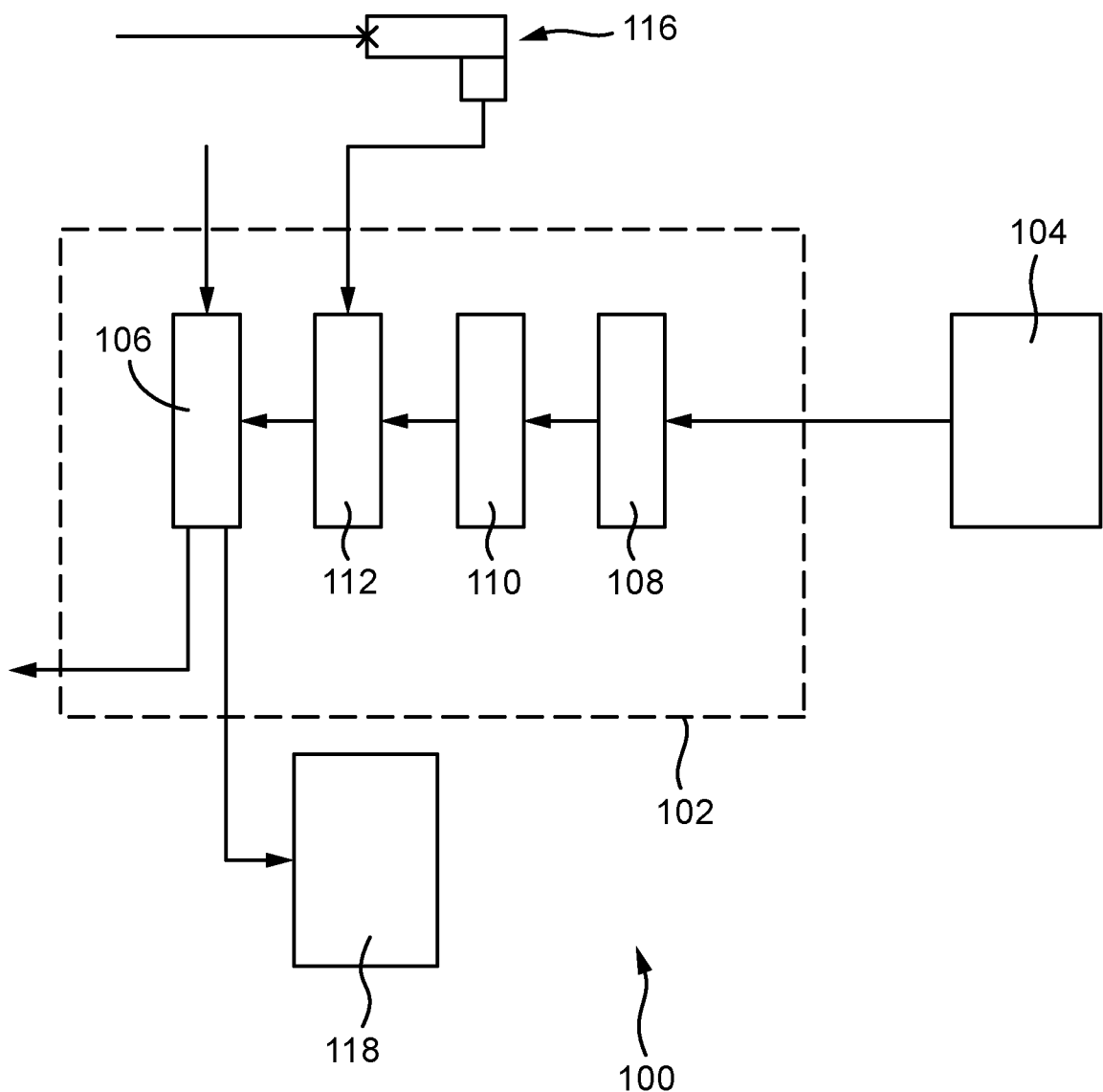
FIG. 9 is a schematic block diagram illustrating apparatus for creating an atmospheric EM radiation path modifying component according to an exemplary embodiment of the present invention.

Referring to FIG. 9 of the drawings, an apparatus in accordance with an exemplary embodiment of the present invention for creating an atmospheric EM radiation path modifying component comprises a control module 100 communicably coupled to, for example, a dual-axis actuator on which a reflective component is mounted within a laser system such as that described above with reference to FIGS. 2 and 3 of the drawings. Such a laser system may, for example, be mounted in or on an airborne platform such as a manned aircraft or UAV.

The control module 100 comprises a processor 102 communicably coupled to a database 104. The database has stored therein data representative of one or more cell matrices, representative of respective atmospheric volumes, and the cells therein that need to be 'populated' (i.e. heated or ionised) in order to construct a respective three-dimensional atmospheric EM radiation path modifying element. Such data may also include information as to the degree of ionisation/heating required to be maintained in order to achieve the required EM radiation path modifying characteristics of the element. It will be appreciated that the database may simply include a single 'template' or populated cell matrix, bespoke to the platform or application in which the respective atmospheric element is to be used. However, in alternative exemplary embodiments, the database may include a plurality of different such templates from which a required atmospheric component can be selected for use, as required.

The processor 102 includes an input and an interface 106 for receiving an actuation signal indicative that an atmospheric component is required to be created, together with data representative of the size and orientation of the required component, and data representative of the position and orientation of the atmospheric component relative to the platform on which the apparatus is mounted, the electromagnetic radiation path to be modified and/or the laser source used to create the atmospheric component. The actuation signal and accompanying data may be manually entered by an operative, but may (more likely) be automatically generated in response to detection of an electromagnetic detector signal from which the platform is required to be protected/hidden, bearing in mind that the goal of aspects of the present invention is to minimise an adversary detector signal incident upon the platform by diverting the signal. A module may be provided that, not only detects an incoming radar detection signal, but also tracks it as it moves relative to the platform, or the platform moves relative to this, and generates data that can be used, within a feedback loop in the control system, to change the relative position and orientation of the atmospheric component so as to ensure that it remains within the path of the incoming detector signal for as long as it is required to 'hide' the platform.

The processor 102, in response to the actuation signal, searches the database 104 for the populated cell matrix data corresponding to the atmospheric component required to be created, and retrieves the associated data. A transformation module 108 is provided, which transforms the matrix cell data onto data representative of the real atmospheric matrix cell within which the EM radiation path modifying component is to be created, both in terms of size and orientation thereof, and determines precise coordinates for the location of each real atmospheric cell relative to the corresponding respective cell of the stored matrix (and also relative to the platform on which the apparatus is mounted, the electromagnetic source to be modified and/or the laser source used to create the atmospheric component), and a mapping module 110 maps the respective population data from the stored cell matrix onto the data representative of the real atmospheric cell matrix accordingly. Thus, the processor now knows the precise physical location of each cell in the real atmospheric cell matrix and the cell 'population' pattern required to create the atmospheric component. Finally, such data is converted, by a signal processing module 112, into a scanning pattern comprised of a pattern of actuation signals configured to move and actuate the laser beam(s) in order to selectively heat/ionise the real atmospheric cell matrix in the required pattern (and to the required degree) to create the three-dimensional atmospheric element. In other words, the actuation signals are configured to control the power and beam steering of the laser source(s) to heat/ionise each selected cell as required.

Furthermore, an atmospheric component monitoring system 116 may be provided within, or communicably coupled to, the control module 100. The atmospheric component monitoring system 116 may, for example, comprise a low power laser of a suitable wavelength (as will be apparent to a person skilled in the art) to detect atmospheric effects. Thus, the monitoring system 116 may form part of a feedback loop with the signal processing module 112 to enable the actuation signals to be adjusted to compensate for atmospheric distortion. In alternative exemplary embodiments, the apparatus may comprise a quality monitoring module for monitoring the performance (i.e. the properties and characteristics) of the atmospheric element against a predefined set of desired criteria, and generating signals to dynamically adjust beam steering and/or power of the electromagnetic radiation source so as to reduce or eliminate deviation of the properties and characteristics of the atmospheric element from that which is defined by the predefined criteria. Such deviation may be caused by atmospheric distortion or otherwise. In other words, successive and/or continuous 'fine tuning' of the atmospheric element is facilitated to create and maintain an atmospheric element having consistently desired characteristics and quality.

Figure 10:
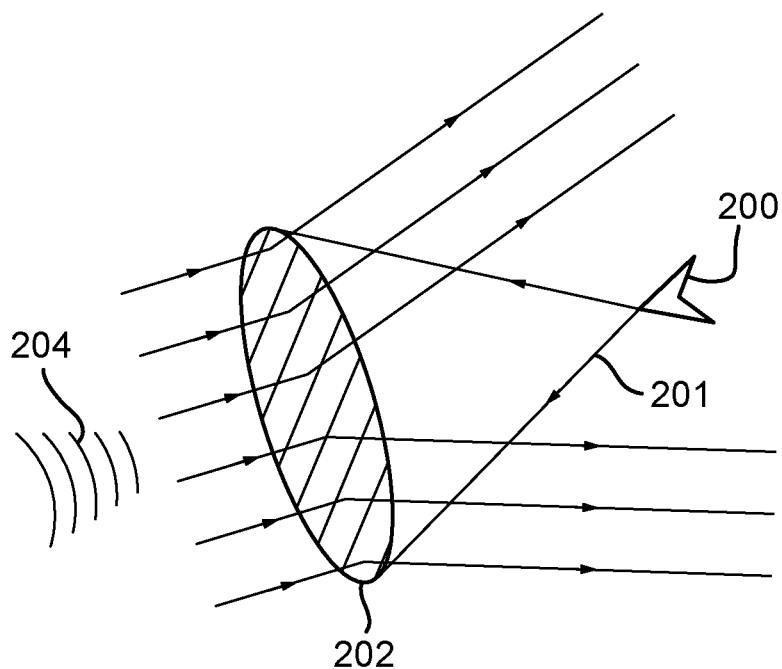
FIG. 10 is a schematic diagram illustrating the configuration and operation of apparatus according to a first exemplary embodiment of the present invention.

Referring to FIG. 10 of the drawings, in a counter measure apparatus according to a first exemplary embodiment of the present invention, the control system mounted on an aerial platform 200 may be configured to create, in the manner described above, a large atmospheric diverging lens 202 (using on-board laser sources 201) at a location within the propagation path of an adversary (monostatic) radar signal 204. The atmospheric lens 202, in this case, comprises a volume of heated cells configured together to form a double convex lens formation, as described above. The lens 202 has the effect of receiving incoming radar signals 204 and diverging them such that they bypass the platform 200 as they exit the lens, thus shielding the platform 200 from detection thereby. A similar result may be achieved, for example, if a reflective atmospheric element were to be employed, which comprises a three-dimensional volume of ionised cells that emulates the operation of a mirror or reflector device. This configuration may be problematic, however, in the case where there is a detector located behind the platform 200, which is expecting to receive the radar signal 204. Failure to receive the signal will indicate to such a detector that there must be an obstruction in the radar path.

Figure 11:
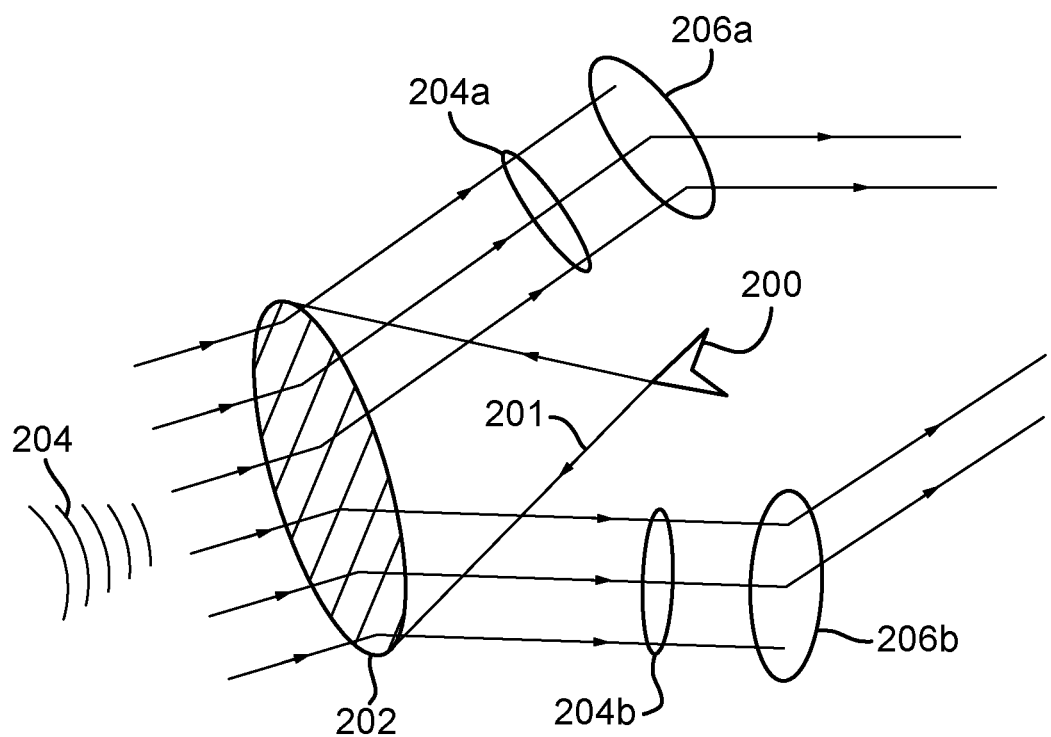
FIG. 11 is a schematic diagram illustrating the configuration and operation of apparatus according to a second exemplary embodiment of the present invention.

Thus, in an alternative exemplary embodiment of the present invention, as illustrated schematically in FIG. 11 of the drawings, the control system on the platform 200 may also be configured to create two further atmospheric reflective or divergent elements 206a,b which receive the radar signals 204a,b exiting the first lens 202 and cause them to be diverged or reflected back toward the original propagation path, thereby effectively causing the radar 204 to be diverted around the platform 200 and 'tricking' a detector located behind the platform 200 into believing that there is no obstruction in the radar path.

It will be appreciated by a person skilled in the art from the foregoing description that modifications and variations can be made to the described embodiments, without departing from the scope of the present invention as defined by the appended claims.

The invention claimed is:

1. A counter measure apparatus for modifying a path of an electromagnetic detector signal so as to minimise or prevent incidence thereof on a platform, the apparatus comprising an electromagnetic radiation source, communicably coupled to a control system, said control system being configured to create an atmospheric element having a different refractive index than a surrounding atmosphere sufficiently to diverge the path of the electromagnetic detector signal incident on the platform such that the path of the electromagnetic detector signal bypasses the platform, said atmospheric element being created within an atmospheric volume located in said electromagnetic detector signal radiation path by causing electromagnetic radiation from said source to be applied to a selected plurality of three-dimensional portions of said atmospheric volume so as to heat and/or ionise the air within said portions so as to generate the atmospheric element, wherein said selected portions are spatially located together in a substantially unbroken, three-dimensional configuration.

2. The apparatus according to claim 1, wherein said control system comprises a detection module for detecting an electromagnetic detector signal and to generate data representative of its propagation angle relative to said platform, said control system being configured to define the location and/or size and/or orientation of said atmospheric volume within said electromagnetic detector signal path, based on said data generated by said detection module.

3. The apparatus according to claim 2, wherein said control system further comprises a tracking module for tracking said electromagnetic detector signal relative to said platform and generating tracking data, said control system being configured to alter the location and/or size and/or orientation of said atmospheric volume based on said tracking signals so as to maintain said atmospheric element within said electromagnetic detector signal path.

4. The apparatus according to claim 1, wherein said electromagnetic radiation source includes a beam steering mechanism for selectively steering a beam of electromagnetic radiation output therefrom, said control system being communicably coupled to said beam steering mechanism and configured to generate signals for steering said beam of electromagnetic radiation relative to said atmospheric volume so as to sequentially apply electromagnetic radiation from said source to said selected portions.

5. The apparatus according to claim 1, wherein said control system comprises a database on which is stored data representative of a three-dimensional matrix configuration of individual three-dimensional elements corresponding to an atmospheric element to be generated for modifying the electromagnetic detector signal radiation path, and a processor for mapping said stored three-dimensional matrix configuration of elements to respective selected portions of said atmospheric volume, the processor being configured to generate actuation signals configured to cause said electromagnetic radiation source to apply electromagnetic radiation to said selected plurality of portions of said atmospheric volume, corresponding to said stored three-dimensional matrix configuration of elements, so as to heat and/or ionise the air therein and thereby generate the atmospheric element in the atmospheric volume.

6. The apparatus according to claim 1, further comprising an atmospheric element monitoring module for monitoring atmospheric conditions, generating data representative thereof, and transmitting said data to a processor, said processor being configured to generate adjusted actuation signals configured to adjust at least one characteristic of said electromagnetic radiation so as to compensate for atmospheric distortion.

7. The apparatus according to claim 1, further comprising a quality monitoring module for monitoring the performance of the atmospheric element against a predefined set of desired criteria, and generating signals to dynamically adjust beam steering and/or power of said electromagnetic radiation source so as to reduce or eliminate deviation of the properties and characteristics of the atmospheric element from that which is defined by the predefined criteria.

8. The apparatus according to claim 3, wherein the tracking module tracks the path of said electromagnetic detector signal and generates a tracking signal for use by said control system to adjust the location of said atmospheric volume so as to maintain said atmospheric element within said path of said electromagnetic detector signal.

9. The apparatus according to claim 1, wherein said selected portions are spatially located together in a substantially unbroken three-dimensional configuration corresponding to the three-dimensional shape of a generated atmospheric element.

10. The apparatus according to claim 1, wherein said selected portions are configured such that non-selected portions are in a configuration corresponding to a three-dimensional shape of a generated atmospheric element.

11. The apparatus according to claim 1, wherein the control system is configured to cause electromagnetic radiation from said source to be applied to a selected plurality of three-dimensional portions of said atmospheric volume so as to heat and/or ionise the air therein and thus change the refractive index thereof.

12. The apparatus according to claim 11, wherein said atmospheric element is operative to generate a radiation diverging device and said selected portions are spatially located together in a convex lens configuration.

13. The apparatus according to claim 11, wherein said atmospheric element is operative to generate a radiation diverging device and the selected portions are spatially located together such that the non-selected portions are in a concave lens configuration.

14. The apparatus according to claim 1, wherein the atmospheric element is operative to generate a reflective device and the control system is configured to cause electromagnetic radiation from said source to be applied to said selected plurality of three-dimensional portions of said atmospheric volume so as to heat and/or ionise the air therein.

15. A counter-measure method for modifying a path of an electromagnetic detector signal so as to prevent incidence thereof on a platform, the method comprising providing an electromagnetic radiation source and a control system communicably coupled thereto, the method further comprising dividing an atmospheric volume into a matrix of three dimensional portions, configuring said control system to generate an atmospheric element having a different refractive index than a surrounding atmosphere sufficiently to diverge the path of the electromagnetic detector signal incident on the platform such that the path of the electromagnetic detector signal bypasses the platform, said atmospheric element being created within an atmospheric volume located in said electromagnetic detector signal path by causing electromagnetic radiation from said source to be applied to a selected plurality of three-dimensional portions of said atmospheric volume so as to heat and/or ionise the air within said portions, wherein said selected portions are spatially located together in a substantially unbroken, three-dimensional configuration to generate said atmospheric element.

* * * * *